United States Patent [19]

Prendiville

[11] Patent Number: 5,738,894
[45] Date of Patent: Apr. 14, 1998

[54] SKIN REMOVAL PROCESS

[75] Inventor: John Edward Legge Prendiville, London, United Kingdom

[73] Assignee: James Foxdale Ltd., Hoylake, United Kingdom

[21] Appl. No.: 451,073

[22] Filed: May 25, 1995

Related U.S. Application Data

[63] Continuation-in-part of PCT/GB94/02539 Nov. 18, 1994.

[30] Foreign Application Priority Data

Nov. 18, 1992 [GB] United Kingdom ............... 9224135
Nov. 19, 1993 [GB] United Kingdom ............... 9323844

[51] Int. Cl.$^6$ ................................................ A23L 1/36
[52] U.S. Cl. ..................... 426/483; 426/482; 426/481; 426/632; 99/568; 99/570
[58] Field of Search ........................... 426/481, 482, 426/483, 632; 99/568, 570

[56] References Cited

U.S. PATENT DOCUMENTS

| 1,367,664 | 2/1921 | Kennedy . |
| 1,717,647 | 8/1929 | Barody . |
| 1,887,256 | 11/1932 | Bizzel et al. . |
| 2,329,403 | 9/1943 | Logue . |
| 2,651,345 | 9/1953 | Schoolcraft . |
| 3,077,217 | 2/1963 | Hind . |
| 4,082,867 | 4/1978 | Henley et al. . |
| 4,300,447 | 11/1981 | Hoover . |
| 4,537,122 | 8/1985 | George . |
| 4,738,860 | 4/1988 | Lee . |
| 4,785,729 | 11/1988 | Latreyte . |
| 4,996,917 | 3/1991 | Burlock et al. . |

FOREIGN PATENT DOCUMENTS

| 0 043 324 | 1/1982 | European Pat. Off. . |
| 2 638 948 | 5/1990 | France . |
| 2 663 512 | 12/1991 | France . |
| 39 14355 | 11/1989 | Germany . |
| 61-21079 | 1/1986 | Japan . |
| 02 60580 | 3/1990 | Japan . |
| 4-26830 | 5/1992 | Japan . |
| 1 190 522 | 5/1970 | United Kingdom . |
| 113/83 | 7/1984 | Yugoslavia . |

*Primary Examiner*—Carolyn Paden
*Attorney, Agent, or Firm*—Bacon & Thomas

[57] ABSTRACT

A process and apparatus for removing the skin from products such as nut kernels, beans, seeds or the like. The process comprises subjecting the products to a jet or jets of water at ambient temperature in a confined area to cause their abrasion against each other so as to remove their skins. The apparatus includes cages (4) arranged to receive the products and a liquid jet manifold (8) adapted to direct the jet or jets at the product.

9 Claims, 3 Drawing Sheets

SKIN REMOVAL PROCESS

CROSS REFERENCE TO RELATED APPLICATION

This application is a continuation-in-part of International Patent Application No. PCT/GB94/02539 designating the U.S.A. with an international filing date of 18 Nov. 1994.

FIELD OF THE INVENTION

The present invention relates to a process and apparatus for removing the skins from products such as nut kernels, beans, seeds or the like.

DISCUSSION OF RELATED ART

Various devices employing different techniques are known for removing the skins from such products.

With particular reference to nut kernels, devices are known which scrub, brush or scraps the nut kernels, or use other abrasive type treatments to remove the nut kernel skins. In certain cases, 40% of the treated products still have their skins adhered thereto. It is then necessary electro-optically or manually to sort the products and re-treat those on which the skins remain.

In most cases, prior to employing the above skin removing processes, the nuts are pre-treated to loosen the skins for their more efficient removal. Typically pre-treatment involves soaking the nut kernels in water or a suitable aqueous solution. Alternatively the pre-treatment may take the form or roasting the kernels or heating them in hot air, steam, water or an aqueous solution.

The speed and efficiency at which nuts can be processed in these known methods of skinning is reduced by the additional pre-treatment process steps involved. Although necessary in order to attain skinned nuts of the required quality, these pre-treatment steps are thus undesirable since they add time to the skinning operation as a whole. The apparatus required for such pre-treatments moreover usually involve considerable extra plant investment costs and maintenance costs.

Particular forms of pre-treatment also have their particular associated problems. For example, with treatments that involve a nut kernel being heated, the heat so applied can cause damage to the kernel's cell structure, reducing its shelf life and affecting its flavour characteristics. Also, when heating the nut kernel has only been partially successful in loosening the kernel skin, reheating is not desirable due to the likelihood of damage.

Soaking forms of pre-treatment have the disadvantage that they are typically highly time consuming. In one known process for example, nut kernels are soaked in water or sodium hydroxide for about eight hours. Since all the nut kernels have to pass through the soaking step before they are skinned, the output of the skinning process will depend on the amount of nuts which can be soaked at any given time. Soaking in chemical solutions requires careful monitoring in order to ensure that the nut kernels are themselves not damaged by the action of the solution.

It has been proposed in U.S. Pat. No. 4,537,122 to skin almond nuts by fluidising a bed of nuts with air. In this system, the nuts are first presoaked and washed to remove 90–95% of their skins and the remaining 5–10% is removed by the fluidising air. Thus several steps are involved.

It has been proposed in U.S. Pat. No. 4,300,447 to skin peanuts by the abrasive action of a rotating cylinder in combination with jets of air. Again, in this proposal, it is preferred for the raw peanuts to be preconditioned by warm or hot air or hot water or aqueous solution. A significant proportion of the nuts may remain unskinned without such pre-treatment.

It has been proposed in U.S. Pat. No. 2,651,345 to provide a machine which uses water jets as part of a process to remove the skins from hazelnuts. The nuts are contained in a series of parallel elongate chambers where they are supported on rotating rolls having spiral ridges for conveying the nuts along the chambers whilst being subjected to jets of water. Thus each nut is effectively conveyed individually along a chamber during the skinning process and this is inefficient in terms of production rates. The machine is complicated as it is designed to position the nuts such that the jets of water strike them "glancing blows". In addition, the rotation of the nuts on the rollers demands, in the main, uniformly spherical and uniformly sized nuts, thereby limiting the types and varieties which can be used in the machine. For example, certain types of hazelnut are "acorn" or "cone" shaped and will not readily turn on the rollers.

It has been proposed in U.S. Pat. No. 4,738,860 to provide a machine concerned exclusively with walnuts. The walnuts are subjected to water jets, but this does not itself remove the skins. Following the application of water jets, the skinned walnuts and the skins are taken together to a centrifuge and thereafter the skins and the nut meat are separated by means of an air blower. The process is therefore inefficient in that additional steps are required to remove the skins from the skinned nuts.

BRIEF SUMMARY OF THE INVENTION

According to one aspect of the present invention there is provided a process of removing the skin from products such as nut kernels, beans, seeds or the like, the process comprising receiving a plurality of the products in a confined area with the products in contact with each other, subjecting said products to a jet or jets of liquid so as to cause the products to abrade against each other and to remove their skins, and allowing the skins removed from the products to be carried away from the skinned products by said liquid.

According to a second aspect of the present invention there is provided apparatus for removing the skin from products such as nut kernels, beans, seeds or the like, comprising receiving means defining the confined area and arranged to receive a plurality of the products in a body thereof with the products in contact with each other, the receiving means having liquid outlet means, and liquid discharge means adapted to direct a jet or jets of liquid at the products so as to remove their skins, whereby the skins removed from the products are carried away from the skinned products by said liquid and via said outlet means of the receiving means.

The action of the jet or jets of liquid loosens and removes the skins whilst in addition creating movement of the products which allows the skins to escape. The liquid serves to carry away the removed skins. The combination of the liquid action and abrasion between the products provides a very efficient process in which the skins of a large number of products may be simultaneously removed from the skinned products and carried away therefrom. The time taken to remove the skins is relatively short, for example of the order of 90 seconds for Oregon hazelnuts and or 35 seconds for Turkish hazelnuts.

Preferably, the products are not pre-treated before being subjected to the jet or jets of liquid. Thus for example raw products, such as hazelnut kernels, may be subjected to the jet or jets of liquid. This saves expense and time in the production process. In particular, there is no need for preheating or presoaking and no use of chemicals or even water in a pre-treatment step or steps.

In the preferred embodiments, the liquid used is water, a readily and cheaply available product.

The or each jet may be produced by discharging the liquid through a liquid discharge means, such as a nozzle. The nozzle is preferably such as to produce a so-called flat-spray jet. This is a jet which diverges from the nozzle at an angle and in cross-section (perpendicular to the flow direction) has the shape of an ollipec with the major axis considerably greater than the minor axis. The divergence angle may be very small, thereby concentrating the effect of the jet over a small area, but increased coverage is obtained with a wider jet which is able to impact against a larger member of products simultaneously. Thus the nozzles may be such as to produce a flat-spray jet with spray angles of, for example, 15°, 25°, 40°, 65°, 80°, 95° or 110°. Suitable nozzles are supplied by Lurmakr Limited, of Longstanton, Cambridge, England and a particularly effective nozzle made by that company is model B2CM02E15, which produces a 15° flat-spray jet.

The required pressure of the liquid will depend on the products to be skinned and the shape of the jet or jets. The liquid may be pressurised at a pressure in the range of 600 psi (pounds per square inch) to 2000 psi, preferably 800 psi to 1800 psi, more preferably 1400 psi to 1600 psi. In a preferred process involving the skinning of hazelnut kernels a pressure of 1500 psi is very effective. It will however be possible in certain circumstances and with certain products to use pressures falling within a broader range, from 35 psi to 5000 psi.

Lower pressures may be effective with a narrow spray angle (since spray impact is greater with narrower spray angles at a similar flow rate) and/or with the jet being generated by discharge means is close proximity to the products, whilst higher pressures may be required with a wide spray angle and/or with the jet being generated further away from the products.

The pressurisation of the liquid will normally be generated by a pressure source such as a pump. Reciprocating pumps are preferred, although other pumps may also be used. Where several jet discharge means are used, the pressure source will need to be of sufficient capacity to maintain an adequate pressure supply to all the discharge means. It may be desirable to use more than one pressure source.

Liquid flow rates will vary depending on the pressures used and the size of the nozzle. Flow rates may vary for example in a range of 5 to 12 liters per minute per nozzle.

The spacing of the jet discharge means from the body of the products may be chosen according to the particular products, the pressure used, the spray-angle etc. A spacing not greater than 6 inches is preferred, and a spacing in the range of 1–3 inches is particularly preferred.

Preferably, no heat is used in the process; in other words, the liquid used is at ambient temperature. This saves on energy costs. Moreover, the call structure of the product is unchanged, thereby making it possible to return for reprocessing any products with skin still adhering to their surface. However, in view of the efficiency of the skin removal process, it will generally be necessary to repeat the method process on only a small proportion of the products, if any.

In a preferred process, the position of the jet discharge means (e.g. one or more nozzles) and a body of the products are moved relative to each other. This can ensure that all the products are directly sprayed by the jet or jets. Thus for example, the position of the discharge means may be stationary and the body of products moved around, or both may be moved around. Preferably, the body of products is stationary and the position of the discharge means of the jet or jets is moved.

Preferably the spacing between the discharge means of the jet or jets of liquid and the body of products is adjustable. This may be advantageous if the same apparatus is to be used for different products.

In a preferred embodiment the jet or jets are provided vertically above the products and the relative movement occurs in a horizontal plane. There may be movement in first and second mutually perpendicular directions.

It is possible to load the receiving means with products at a product loading station where skin removal is also carried out, either by arranging the jet discharge means to be permanently located at the loading station or to be movable to the loading station after loading. It is however preferred for the receiving means to be movable from a product loading station to a skin removal station. Unloading of the skinned products may also be carried out at the same station as loading and skinning, but again it is preferred for the receiving means to be movable from the skin removal station to a product unloading station.

Movement of the receiving means between the stations may for example be effected by sliding or rolling of the receiving means on tracks, rails or the like. Return of the receiving means after unloading to the loading station may be effected manually or by appropriate conveying means. For example, the receiving means may be mounted on a chain conveyor, whereby the receiving means follows a forward, upwardly facing path and a return, downwardly facing path.

Loading of the receiving means may be carried out manually or by known hopper and product dosing arrangements. Unloading may be carried out manually or by known tipping mechanisms, suitably adapted if necessary. If a chain conveyor as mentioned above is used, tipping is effected automatically.

The receiving means advantageously encloses the products in a confined area to prevent them from escaping during skin removal, whilst of course permitting the removed skins to be carried away. The receiving means may therefore have a lid which is closed after loading. Preferably, the receiving means is open-topped at the product loading station and a lid for the receiving means is provided at the skin removal station. This is particularly convenient, since in a process involving several receiving means only one lid needs to be provided. The lid will of course be such as to allow entry of the jet or jets to the receiving means.

The abrasion between the products agitated by the jet or jets is important in the skin removal process. In general, the process is inefficient if too few products are enclosed by the receiving means because of reduced product-to-product abrasion, whilst it is also inefficient if too many products are enclosed because of the restricted movement of the products. Preferably the volume occupied by the products in a receiving means in which they are enclosed for skin removal is in the range of 20% to 80% of the total volume of the receiving means, more preferably 50% to 75%. Abrasion between the products and the walls of the receiving means is also of assistance to the skin removal process.

A splash plate may be provided adjacent the receiving means to redirect liquid which has left the receiving means, back at the products. The plate is preferably positioned on a side of the receiving means opposite to that of the supply of the jet or jets and is arranged to extend substantially at right angles to the direction of flow of the jet or jets. Thus, for example, if the jet or jets are provided above the receiving means, then the splash plate will be below the receiving means. The splash plate helps to ensure the high efficiency of the process.

The receiving means for the products to be skinned may comprise at least one cage. The apertures of the cage are then small enough to retain the products and large enough to allow the products' skins to escape from the cage. The liquid used to skin the products carries the removed skins through the apertures in the cage. In general, the liquid and the skin will drain through the bottom of the cage. No additional processes to separate the skinned products and the skins are thus required.

The inside faces of the cage may be provided with an abrasive surface, eg. a mesh or gauze-like finish, to assist the skin removing process.

Following skin removal, the products can be dried. This can be carried out for example using known dehumidification equipment. It will generally be desirable to dry the products at air temperature below about 45° C., preferably about 40° C., so as to avoid heating of the products which would tend to reduce their shelf life.

BRIEF DESCRIPTION OF THE DRAWINGS

An embodiment of the present invention will now be described by way of example and with reference to the accompanying drawings, wherein.

DETAILED DESCRIPTION

Figure 1:
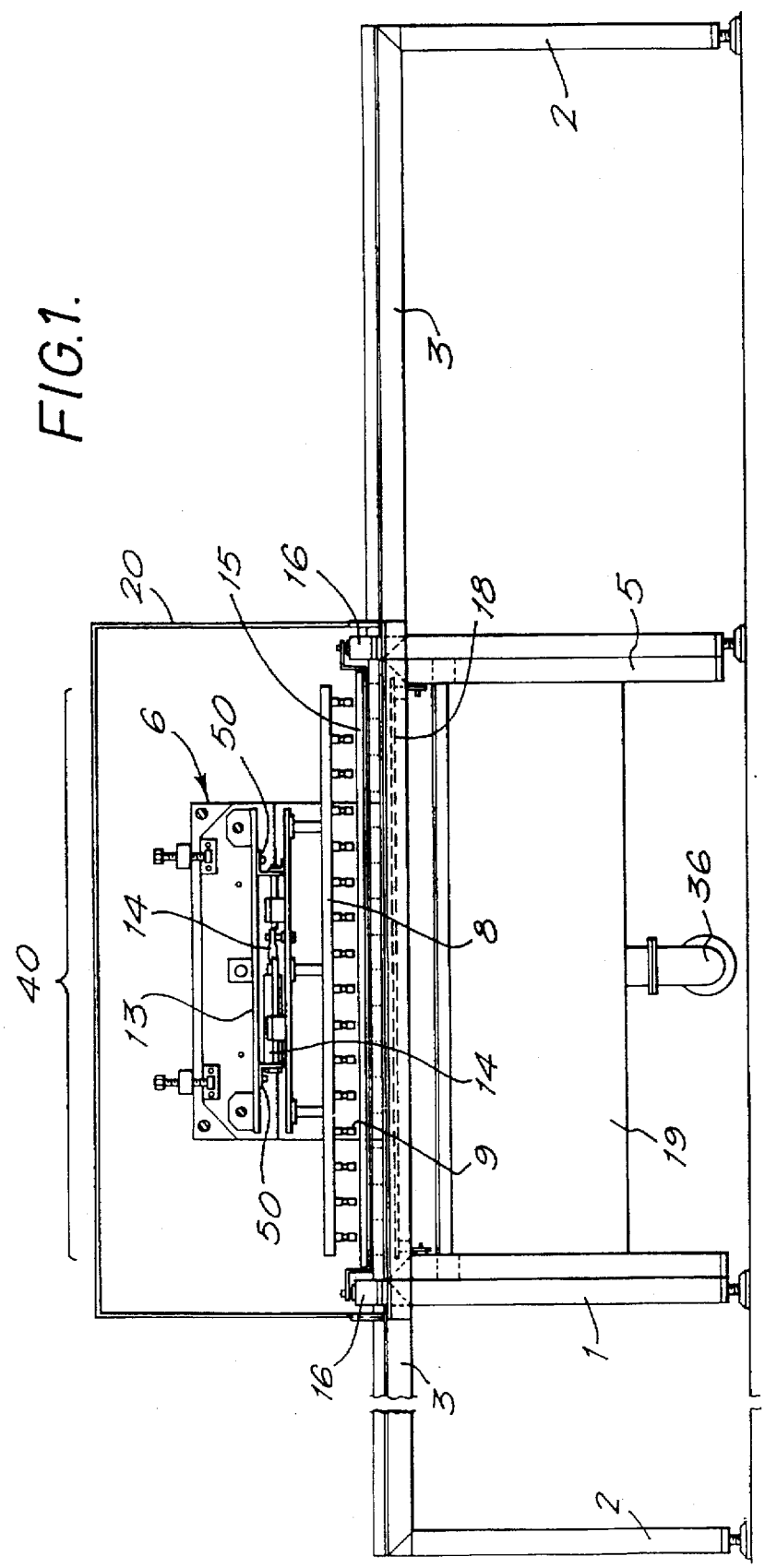
FIG. 1 shows a front elevation of apparatus for removing the skin from products in accordance with an embodiment of the present invention.

The skinning apparatus comprises a main frame 1 having four pairs of support legs 2, a platform 3 supported by the legs and receiving four product trays 30 made up of product receiving means in the form of cages 4, and a centre frame 5 mounted between the two pairs of centrally positioned legs and supporting thereon a water supply mechanism 6. The water supply mechanism is arranged above a product processing area 40 defined centrally of the platform 3.

The frame and tray components are made from stainless steel for its anti-corrosive properties although alternative materials such as other suitable metals or plastics may be used.

Figure 4:
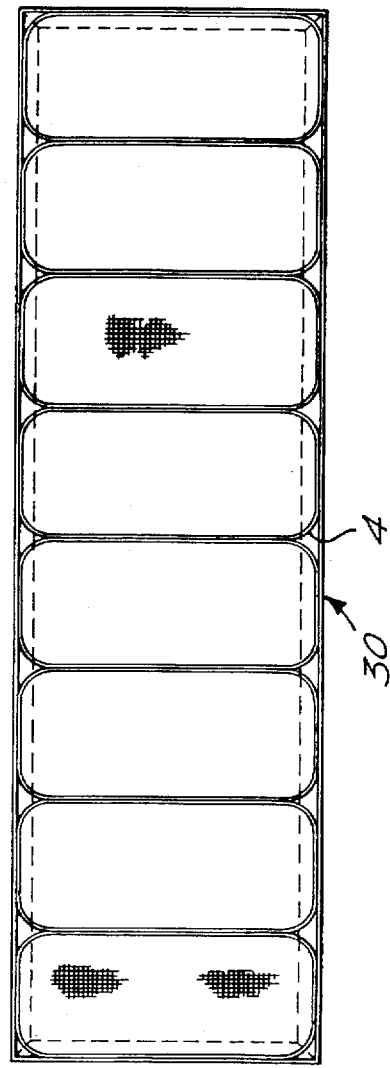
FIG. 4 shows in plan view a tray of cages suitable for use in the skinning apparatus, to a larger scale.

As seen in FIG. 4, each product tray 30 comprises eight cages arranged in a row. Any suitable number of cages may be used, joined together or separate. Two pairs of product trays 30 are provided, the trays of each pair being arranged side by side. The trays are slidably received on rails 7 which extend along the length of the apparatus and which allow the trays to be moved into and out of the processing area 40 below the water supply mechanism 6 via both ends of the apparatus.

As shown in FIG. 1, a lid 15 a provided for the trays, which extends along the trays when located in the processing area 40 and which can be lowered, by means of pneumatically driven pistons 16, into place on top of the cages 4 to prevent any products escaping from the top of the cages during the skinning process. The lid 15 is formed with holes to allow jets of water from the water supply mechanism 6 to reach the products.

The water supply mechanism 6 includes a manifold 8 which distributes water to sixteen pairs of laterally spaced nozzles 9. Each cage 4 is thus provided with a nozzle above it.

Figure 2:
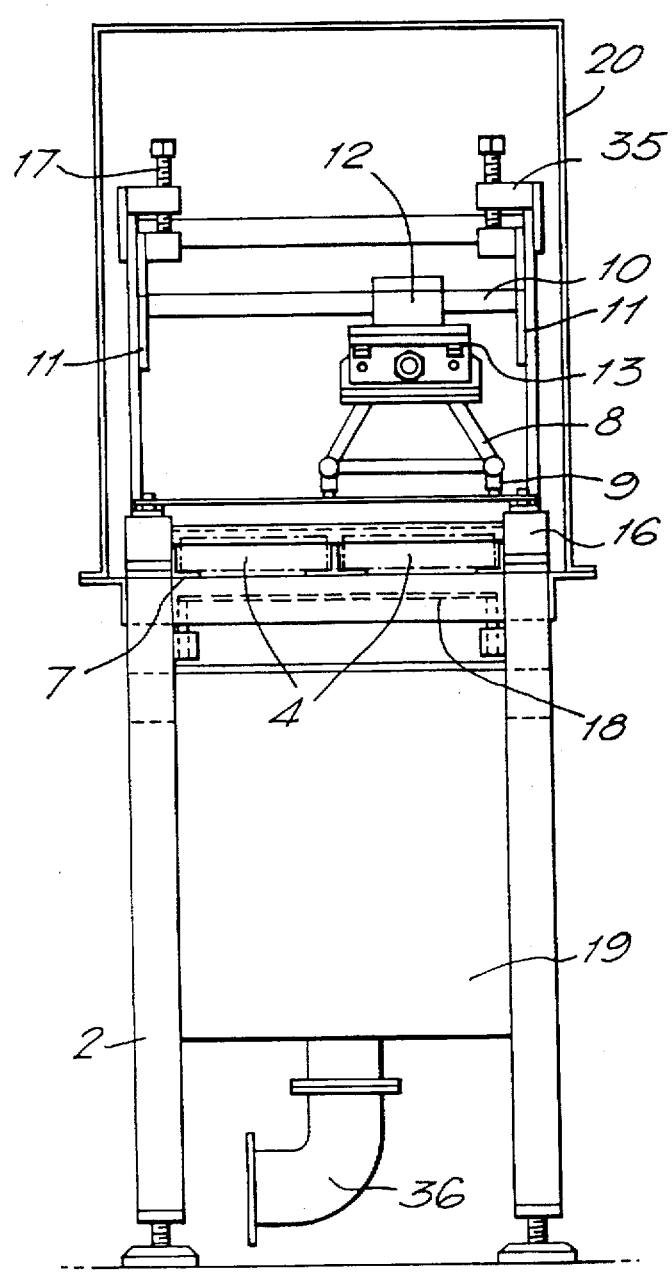
FIG. 2 shows an end elevation of the skinning apparatus.
Figure 3:
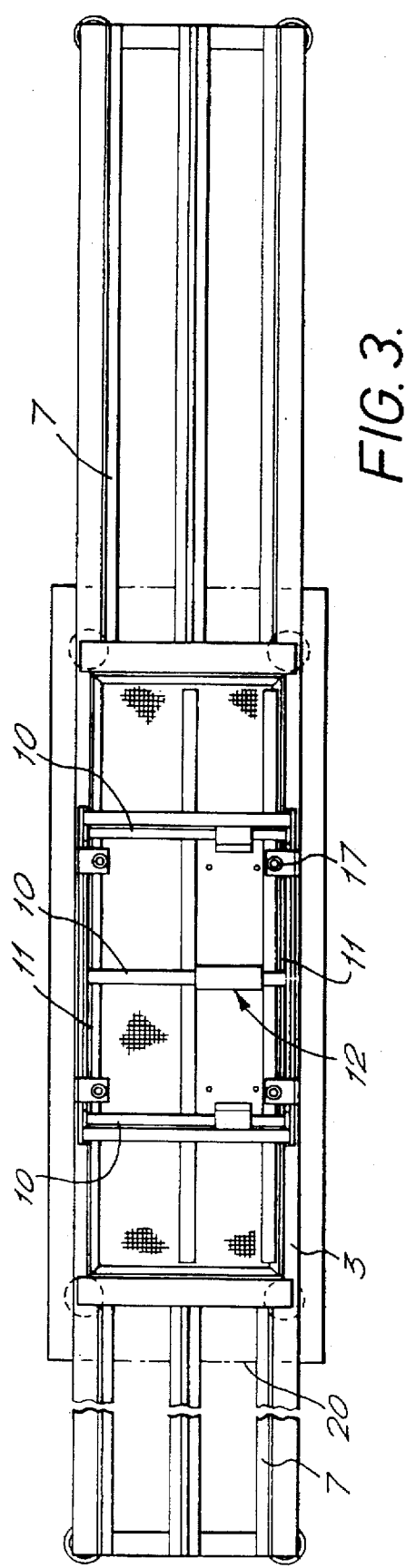
FIG. 3 shows a plan view of the skinning apparatus.

In order to achieve relative horizontal movement between the products held in cages 4 and the jets of water emanating from the nozzles 9, the manifold 8 is mounted for limited longitudinal and lateral movement. The water supply mechanism 6 is supported for lateral movement across the apparatus on three lateral shafts 10 provided between frame members 11 or the centre frame 5, as shown in FIGS. 2 and 3. The movement is controlled by attaching a pneumatically driven piston/cylinder arrangement 12 between the water supply mechanism 6 and the frame members 11. The piston/cylinder arrangement 12 can thus be operated to move the water supply mechanism 6, and thus the manifold 8, across the apparatus as required.

A similar arrangement is used to move the manifold 8 longitudinally of the apparatus. The water supply mechanism 6 has a longitudinal plate member 13 which is supported by the lateral shafts 10 and from which a pair of longitudinally spaced brackets 50 depend. A pneumatically driven piston/cylinder arrangement 14 extends between the brackets and carries the manifold 8 for longitudinal movement on the water supply mechanism 6.

Alternative arrangements for creating the required movement of the manifold, such as rack and pinion or worm screw devices, may be employed. The relative movement of the cages 4 and nozzles 9 need not result from movement merely of the manifold. The nozzles may be kept stationary and the cages moved, or both may be moved.

A height adjustment mechanism 35 is provided at the top of centre frame 5. This includes threaded bolts 17 rotation of which causes vertical movement of frame members 11 relative to the main body of the centre frame 5. Thus the height of the water supply mechanism is adjustable, whereby the pressure and the area covered by the jets on contact with the products can be altered. The pressure of the jets may be altered at the pressure source, which may be a pump (not shown).

As shown in FIGS. 1 and 2, a splash plate 18 is positioned below the cages 4 and faces the nozzles 9. It acts to redirect water which has passed through the cages back at the products. The water redirected in this manner results in a secondary skinning action of the products helping to ensure a high efficiency of the process. The splash plate is preferably positioned at a slight incline, such that skins that have been removed can drain away. The splash plate may be grooved or have ridges or apertures or other suitable configurations in order to assist such drainage.

A collecting chamber 19 is located below the product processing area 40 to receive the water and removed skins from the splash plate 18. The collecting chamber has an outlet 36.

A cover 20 encloses the processing area 40 of the apparatus, ensuring safe and clean operating conditions around the machine. The cover is readily removable for easy maintenance of the working parts of the apparatus and may be formed entirely of hardened glass or plastics or of other suitable materials with perhaps viewing ports.

The use of the apparatus will now be described. Each cage 4 is filled, by any suitable method, to approximately two thirds (67%) of its capacity by volume. The trays 30 are then slid into the processing area 40 below the array of nozzles 9. With the trays in position, the lid 15 is lowered into position by operation of the pistons 16. Water is sprayed under pressure directly at the products, whilst at the same time the manifold 8 is moved laterally and longitudinally by operation of the respective piston/cylinder arrangements 12 and 14. Any suitable liquid may be used, although the availability and low cost of water makes it a good choice.

The action of the pressurised water directly loosens and removes the skins from the products whilst in addition creating movement of the products allowing their skins to escape through the apertures in the cages 4. The movement of the manifold 8 is such as to direct the nozzles' jets along a path whereby substantially all the products are acted upon by the pressurised water. The path followed by the nozzles may be adjusted to suit requirements. The water may be pressurised at a pressure in the range of 35 psi to 5000 psi, depending on the product being processed.

In a trail of the process according to a preferred embodiment, a cage made of stainless steel spot welded 22 gauge mesh ¼ by ½ inch nominal spacing and having overall dimensions 1.5 inches deep by 3 inches wide by 7 inches long was filled two thirds full (i.e. to a depth of 1 inch) with unskinned hazelnuts. A pump generating a pressure of approximately 1500 psi supplied a single nozzle with water to generate a 15° flat spray. The flow rate was approximately 8 liters per minute. The nozzle was located at a spacing of 1¾ inches from the top level of the body of hazelnuts (when static) and directed downwardly whilst being moved in a horizontal plane to cover substantially the entire surface area of the cage. The result was that 99% of the hazelnuts were skinned completely after 90 seconds of spraying.

The process according to the preferred embodiments of the present invention thus achieves products which are reliably and efficiently skinned without the use of pre-treatment processes or processes for separating the skinned products and their skins.

I claim:

1. A process of removing the skin from products such as nut kernels, beans and seed, the process comprising receiving a plurality of the products in a confined area with the products in contact with each other, subjecting said products to a jet or jets of liquid within said confined area so as to cause the products to move and to abrade against each other in said confined area and to remove their skins by said abrasion and jet or jets of liquid, and allowing the skins removed from the products to be carried away from the skinned products by said liquid, wherein the liquid is pressurized at a pressure in the range of 600 psi to 2000 psi.

2. A process of removing the skin from products such as nut kernels, beans and seed, the process comprising receiving a plurality of the products in a confined area with the products in contact with each other, subjecting said products to a jet or jets of liquid within said confined area so as to cause the products to move and to abrade against each other in said confined area and to remove their skins by said abrasion and jet or jets of liquid, and allowing the skins removed from the products to be carried away from the skinned products by said liquid, wherein the liquid used is at ambient temperature.

3. A process as claimed in claim 2, wherein the products are not pre-treated before being subjected to the jet or jets of liquid.

4. A process as claimed in claim 2, wherein the liquid used is water.

5. A process as claimed in claim 2, wherein the position of discharge means of the jet or jets of liquid and a body of the products are moved relative to each other.

6. A process as claimed in claim 2, wherein the volume occupied by the products in a receiving means defining the confined area in which they are received for skin removal is in the range of 20% to 80% of the total volume of the receiving means.

7. A process as claimed in claim 2, wherein the volume occupied by the products in a receiving means in which they are enclosed for skin removal is in the range of 50% to 75% of the total volume of the receiving means.

8. A process as claimed in claim 2, wherein discharge means of the jet or jets of liquid is spaced from the body of the products by less than 6 inches.

9. A process of removing the skin from products such as nut kernels, beans and seed, the process comprising receiving a plurality of the products in a confined area with the products in contact with each other, subjecting said products to move and to abrade against each other in said confined area and to remove their skins by said abrasion and jet or jets of liquid, and allowing the skins removed from the products to be carried away from the skinned products by said liquid, wherein the liquid is pressurized at a pressure in the range of 800 psi to 1800 psi.

* * * * *

UNITED STATES PATENT AND TRADEMARK OFFICE
CERTIFICATE OF CORRECTION

PATENT NO.    : 5,738,894                                        Page 1 of 1
DATED         : April 14, 1998
INVENTOR(S)   : John Edward Legge Prendiville It is certified that error appears in the above-identified patent and that said Letters Patent is hereby corrected as shown below:

Column 8,
Line 30, after "means" insert -- defining the confined area --
Line 31, change "enclosed" to -- received --
Line 45, add the following claim:
-- 10. A process as claimed in claim 5, wherein the jet or jets are provided vertically above the products and the relatice movement occurs in a horizontal plane. --

Signed and Sealed this

Fifth Day of February, 2002

*Attest:*

JAMES E. ROGAN
*Attesting Officer*       *Director of the United States Patent and Trademark Office*